US012608904B2

(12) United States Patent     (10) Patent No.:   US 12,608,904 B2

Lee et al.            (45) Date of Patent:     Apr. 21, 2026

(54) METHOD AND APPARATUS FOR IMAGE PREPROCESSING BASED ON OBJECT OF INTEREST

(71) Applicant: ELECTRONICS AND TELECOMMUNICATIONS RESEARCH INSTITUTE, Daejeon (KR)

(72) Inventors: Hee-Kyung Lee, Daejeon (KR); Jin-Young Lee, Seoul (KR); Hyon-Gon Choo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 295 days.

(21) Appl. No.: 18/237,693

(22) Filed: Aug. 24, 2023

(65) Prior Publication Data

US 2024/0071036 A1     Feb. 29, 2024

(30) Foreign Application Priority Data

Aug. 25, 2022    (KR) ........................ 10-2022-0106718
Jul. 31, 2023     (KR) ........................ 10-2023-0099483

(51) Int. Cl.
    *G06V 10/00*       (2022.01)
    *G06V 10/22*       (2022.01)
    *G06V 10/26*       (2022.01)
    *G06V 10/77*       (2022.01)

(52) U.S. Cl.
    CPC .......... *G06V 10/273* (2022.01); *G06V 10/225* (2022.01); *G06V 10/77* (2022.01); *G06V 10/7715* (2022.01)

(58) Field of Classification Search
    CPC ...... G06V 10/82; G06V 10/25; G06V 10/273; G06V 10/7715; G06V 10/77; G06V 10/225
    See application file for complete search history.

(56) References Cited

U.S. PATENT DOCUMENTS

| | | | |
|---|---|---|---|
| 7,697,771 B2 | 4/2010 | Atsumi et al. | |
| 7,792,372 B2 | 9/2010 | Ryu | |
| 8,089,548 B2 * | 1/2012 | Ogura | G06T 7/194 |
| | | | 348/222.1 |
| 8,135,172 B2 * | 3/2012 | Ike | G06T 7/248 |
| | | | 358/448 |
| 8,290,265 B2 * | 10/2012 | Gao | G06V 10/255 |
| | | | 382/173 |
| 9,754,174 B2 * | 9/2017 | Sugiyama | G06T 7/70 |
| 10,467,459 B2 * | 11/2019 | Chen | G06V 10/454 |

(Continued)

FOREIGN PATENT DOCUMENTS

| | | |
|---|---|---|
| CN | 109101858 A | 12/2018 |
| CN | 109862370 A | 6/2019 |

(Continued)

*Primary Examiner* — Amir Alavi

(74) *Attorney, Agent, or Firm* — LRK PATENT LAW FIRM

(57) ABSTRACT

Disclosed herein is a method for image preprocessing based on an object of interest. The method includes extracting an object region of interest from an input image, adjusting the object of region of interest, and adjusting a background region excluding the object region of interest.

16 Claims, 11 Drawing Sheets

(56) References Cited

U.S. PATENT DOCUMENTS

| | | | |
|---|---|---|---|
| 10,848,837 B2 | 11/2020 | Yun et al. | |
| 11,373,313 B2 * | 6/2022 | Obayashi | G06N 3/08 |
| 11,829,153 B2 * | 11/2023 | Hashimoto | G06T 7/70 |
| 12,056,925 B2 * | 8/2024 | Geiss | H04N 23/76 |
| 12,079,982 B2 * | 9/2024 | Perkins | G06T 7/001 |
| 12,211,311 B2 * | 1/2025 | Park | G06V 10/454 |
| 2015/0254868 A1 * | 9/2015 | Srikanth | H04N 23/61 |
| | | | 348/47 |
| 2021/0006830 A1 | 1/2021 | Yun et al. | |
| 2024/0071036 A1 * | 2/2024 | Lee | G06V 10/25 |

FOREIGN PATENT DOCUMENTS

| | | | |
|---|---|---|---|
| CN | 110147699 A | 8/2019 | |
| CN | 110163052 A | 8/2019 | |
| CN | 110677644 A | 1/2020 | |
| CN | 111163318 A | 5/2020 | |
| JP | 2018-133645 A | 8/2018 | |
| KR | 10-0657797 B1 | 12/2006 | |
| KR | 10-0739785 B1 | 7/2007 | |

* cited by examiner

310 DETECTRON2 INSTANCE SEGMENTATION OR PANOPTIC SEGMENTATION

320 INITIAL ROI

330 DECISION OF SMALL ROI

340 BOUNDING BOXING OF SMALL ROI

350 ADDITION OF MARGIN AROUND BBOX

360 INTEGRATE SMALL BBOXES

370 PAINT DOMINANT OR AVERAGE COLOR ON THE BACKGROUND AREA EXCEPT ROI

RANDOM 75%     BLOCK 50%     GRID 75%

| QP | TVD_ANCHOR | | BBOX_20000_20_DOMINANT(A) | | BBOX_ALL_20_DOMINANT(B) | | BOPP RATIO | |
|---|---|---|---|---|---|---|---|---|
| | BPP | mAP | BPP | mAP | BPP | mAP | A/ORIGIN | B/ORIGIN |
| 0 | | 45.165200 | | 37.229800 | | 40.106900 | | |
| 22 | 0.474880 | 45.004651 | 0.024209 | 36.907700 | 0.034702 | 41.440700 | 0.050979 | 0.073075 |
| 27 | 0.266330 | 43.802200 | 0.019795 | 36.324300 | 0.019368 | 38.644000 | 0.051797 | 0.072722 |
| 32 | 0.145060 | 40.746255 | 0.008232 | 35155000 | 0.011223 | 37.891700 | 0.056749 | 0.077368 |
| 37 | 0.075230 | 36.796257 | 0.004880 | 32.110600 | 0.006557 | 33.907500 | 0.064868 | 0.087159 |
| 42 | 0.037100 | 29.090665 | 0.002873 | 23.517500 | 0.003815 | 26.599000 | 0.077439 | 0.102830 |
| 47 | 0.017410 | 18.346201 | 0.001667 | 13.070900 | 0.002173 | 15.909500 | 0.095750 | 0.124813 |

FIG. 10

410 DETECTRON2 INSTANCE SEGMENTATION OR PANOPTIC SEGMENTATION

420 INITIAL ROI

430 DECISION OF SMALL ROI

440 SR-BASED MASK UPSCALING OF SMALL ROI

450 ADDITION OF MARGIN AROUND SEGMENT

460 INTEGRATE SMALL SEGMENT

470 PAINT DOMINANT OR AVERAGE COLOR ON THE BACKGROUND AREA EXCEPT ROI

ORIGINAL    MASKED    RECONSTRUCTION    RECONSTRUCTION+VISIBLE 1510    1520    1530

| EXTRACTION UNIT | FIRST ADJUSTMENT UNIT | SECOND ADJUSTMENT UNIT |

METHOD AND APPARATUS FOR IMAGE PREPROCESSING BASED ON OBJECT OF INTEREST

CROSS REFERENCE TO RELATED APPLICATIONS

This application claims the benefit of Korean Patent Applications No. 10-2022-0106718, filed Aug. 25, 2022, and No. 10-2023-0099483, filed Jul. 31, 2023, which are hereby incorporated by reference in their entireties into this application.

BACKGROUND OF THE INVENTION

1. Technical Field

The present disclosure relates to technology for image preprocessing based on an object of interest in order to perform multiple tasks of a machine.

More particularly, the present disclosure relates to technology for preprocessing a region of interest and a background region based on extraction of an object region of interest.

2. Description of Related Art

Image and video coding for machine consumption may have a purpose different from that of image and video coding for human perception. For example, when an image or video is consumed by humans, an image region acquired by capturing the entirety thereof is required, but machines may use only part of the image or video requested or required by an application.

Accordingly, a method for image preprocessing and a method for configuring a preprocessing network that are capable of efficiently performing image and video coding for machine consumption are required.

DOCUMENTS OF RELATED ART (Patent Document 1) Korean Patent No. 0739785, titled "Method and apparatus for encoding and decoding image based on region of interest".

SUMMARY OF THE INVENTION

An object of the present disclosure is to improve the compression ratio of an image and video for machine consumption.

Another object of the present disclosure is to improve multi-task performance through image and video coding for machine consumption.

In order to accomplish the above objects, a method for image preprocessing based on an object of interest according to an embodiment of the present disclosure includes extracting an object region of interest from an input image, adjusting the object region of interest, and adjusting a background region excluding the object region of interest.

Here, the object region of interest may be in the form of a segment or a bounding box.

Here, the object region of interest may be extracted in the form of a segment when the height or width of the object region of interest is greater than a first threshold, but may be extracted in the form of a bounding box when the height or width of the object region of interest is equal to or less than the first threshold.

Here, extracting the object region of interest may comprise adding a margin region in the peripheral region of the object region of interest when the size of the object region of interest is equal to or less than a second threshold.

Here, when the object region of interest corresponds to a segment region, the margin region may be added based on an upscaled segment region acquired by upscaling the segment region.

Here, extracting the object region of interest may comprise, when multiple object regions of interest are present, combining the object region of interest with an additional object region of interest within a preset distance therefrom when the height or width of the object region of interest is equal to or less than a third threshold.

Here, adjusting the background region may comprise adjusting the background region using any one of an image in the dominant color of the background region, an image in the average color thereof, an image in a color set by a user, and a degraded background region image.

Here, the input image may correspond to a segmented image generated by performing masking on an original image.

Here, extracting the object region of interest may comprise storing attribute information of the object region of interest, and the attribute information of the object region of interest may include the height of the object region of interest, the width thereof, the pixel values thereof, an object type, and information about the distance to a nearby object region of interest.

Here, extracting the object region of interest may comprise extracting the object region of interest from part of the input image.

Also, in order to accomplish the above objects, an apparatus for image preprocessing based on an object of interest according to an embodiment of the present disclosure includes an extraction unit for extracting an object region of interest from an input image, a first adjustment unit for adjusting the object region of interest, and a second adjustment unit for adjusting a background region excluding the object region of interest.

Here, the object region of interest may be in the form of a segment or a bounding box.

Here, the object region of interest may be extracted in the form of a segment when the height or width of the object region of interest is greater than a first threshold, but may be extracted in the form of a bounding box when the height or width of the object region of interest is equal to or less than the first threshold.

Here, the extraction unit may add a margin region in the peripheral region of the object region of interest when the size of the object region of interest is equal to or less than a second threshold.

Here, when the object region of interest corresponds to a segment region, the margin region may be added based on an upscaled segment region acquired by upscaling the segment region.

Here, when multiple object regions of interest are present, the extraction unit may combine the object region of interest with an additional object region of interest within a preset distance therefrom when the height or width of the object region of interest is equal to or less than a third threshold.

Here, the second adjustment unit may adjust the background region using any one of an image in the dominant color of the background region, an image in the average color thereof, an image in a color set by a user, and a degraded background region image.

Here, the input image may correspond to a segmented image generated by performing masking on an original image.

Here, the extraction unit may store attribute information of the object region of interest, and the attribute information of the object region of interest may include the height of the object region of interest, the width thereof, the pixel values thereof, an object type, and information about the distance to a nearby object region of interest.

Here, the extraction unit may extract the object region of interest from part of the input image.

BRIEF DESCRIPTION OF THE DRAWINGS

The above and other objects, features, and advantages of the present disclosure will be more clearly understood from the following detailed description taken in conjunction with the accompanying drawings, in which:

FIG. 10 illustrates instance segmentation performance and a compression ratio when a preprocessing network for detecting an object of interest is applied;

DESCRIPTION OF THE PREFERRED EMBODIMENTS

Figure 1:
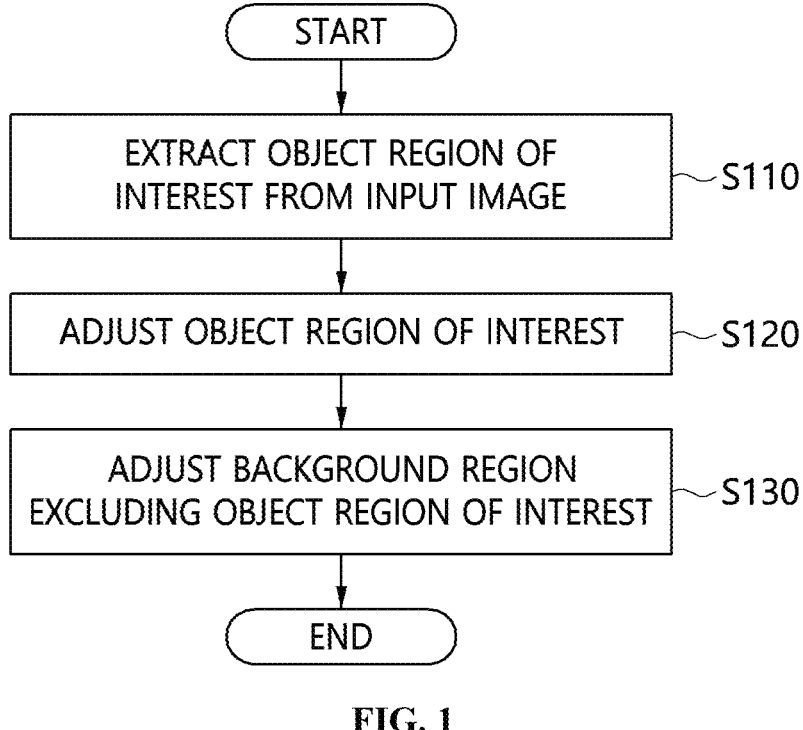
FIG. 1 is a flowchart illustrating a method for image preprocessing based on an object of interest according to an embodiment of the present disclosure.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

The present disclosure proposes a method for Video Coding for Machine (VCM) through a preprocessing network for detecting an object of interest based on the following methods or various combinations thereof as an embodiment.

FIG. 1 is a flowchart illustrating a method for image preprocessing based on an object of interest according to an embodiment of the present disclosure.

The method for image preprocessing based on an object of interest according to an embodiment of the present disclosure may be performed by an image-preprocessing apparatus such as a computing device.

Referring to FIG. 1, the method for image preprocessing based on an object of interest according to an embodiment of the present disclosure includes extracting an object region of interest from an input image at step S110, adjusting the object region of interest at step S120, and adjusting a background region excluding the object region of interest at step S130.

Here, the object region of interest may be in the form of a segment or a bounding box.

Here, the object region of interest may be extracted in the form of a segment when the height or width of the object region of interest is greater than a first threshold, but may be extracted in the form of a bounding box when the height or width of the object region of interest is equal to or less than the first threshold.

Here, extracting the object region of interest at step S110 may comprise adding a margin region in the peripheral region of the object region of interest when the size of the object region of interest is equal to or less than a second threshold.

Here, when the object region of interest corresponds to a segment region, the margin region may be added based on an upscaled segment region acquired by upscaling the segment region.

Here, extracting the object region of interest at step S110 may comprise, when multiple object regions of interest are present, combining the object region of interest with another object region of interest within a preset distance therefrom when the height or width of the object region of interest is equal to or less than a third threshold.

Here, adjusting the background region at step S130 may comprise adjusting the background region using any one of an image in the dominant color of the background region, an image in the average color of the background region, an image in the color set by a user, and a degraded background region image.

Here, the input image may correspond to a segmented image generated by performing masking on an original image.

Here, extracting the object region of interest at step S110 may comprise storing attribute information of the object region of interest, and the attribute information of the object region of interest may include the height of the object region of interest, the width thereof, the pixel values thereof, an object type, and information about the distance to a nearby object region of interest.

Here, extracting the object region of interest at step S110 may comprise extracting the object region of interest from part of the input image.

Figure 2:
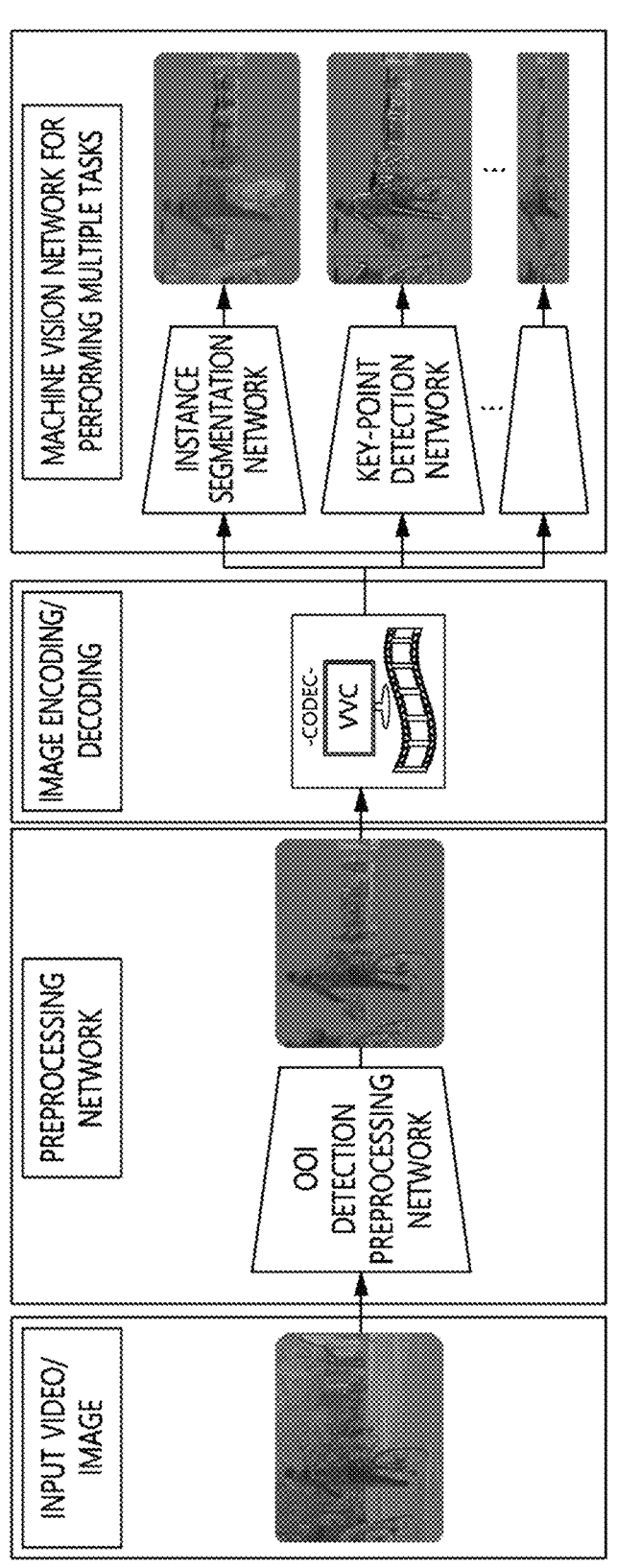
FIG. 2 illustrates a network performance validation pipeline of a preprocessing method based on an object of interest according to an embodiment of the present disclosure.

FIG. 2 illustrates a network performance validation pipeline of a preprocessing method based on an object of interest according to an embodiment of the present disclosure.

Referring to FIG. 2, the network performance validation pipeline of the preprocessing method based on an object of interest may include a video/image input phase, a preprocessing-network-processing phase, an image encoding/decoding phase, and a machine-vision-network-processing phase for performing multiple tasks.

Figure 3:
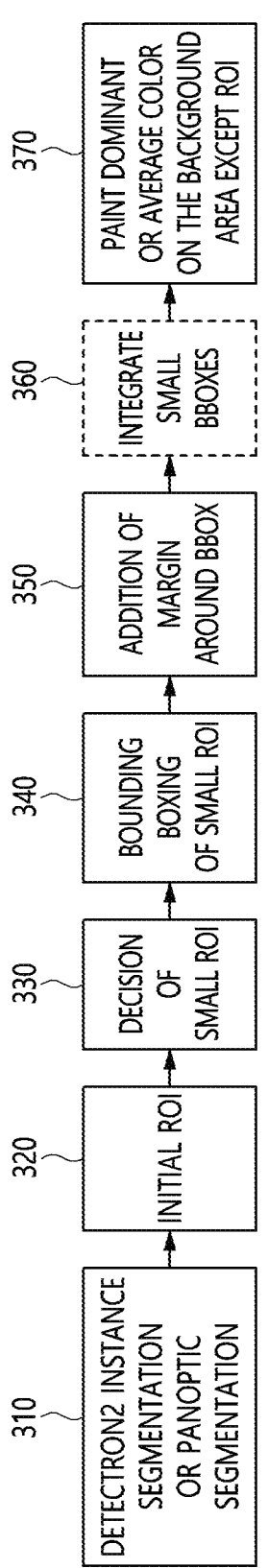
FIG. 3 is an embodiment of a preprocessing network for detecting an object of interest.

FIG. 3 is an embodiment of a preprocessing network for detecting an object of interest.

The method for image preprocessing based on an object of interest according to an embodiment of the present disclosure may be performed based on the preprocessing network for detecting an object of interest such as that illustrated in FIG. 3.

Referring to FIG. 3, the preprocessing network for detecting an object of interest according to an embodiment of the present disclosure may include a network structure or module in order to perform segmenting an instance at step 310, extracting an initial object region of interest at step 320, determining an object region of interest, the size of which is less than a specific size, at step 330, setting a bounding box for the object region of interest, the size of which is less than the specific size, at step 340, adding a margin region to the bounding box or a segment region at step 350, integrating small object regions of interest at step 360, and preprocessing a background region at step 370.

Using a preprocessing network based on at least one of the embodiments to be described below or a combination thereof, an object of interest or a region including the object of interest may be isolated from an input image. Hereinafter, the object of interest or the region including the object of interest is referred to as an object region of interest.

The object region of interest may be a segment region that is acquired by precisely cropping an object included in the input video/image along the outline of the object or a rectangular region including the corresponding object.

The object region of interest may be transmitted after being encoded using image compression technology (e.g., Video Coding for Machines (VCM) or Versatile Video Coding (VVC)).

The object region of interest may be extracted at the fourth step in FIG. 2 by using a descriptor representing the object of interest. When a descriptor-based method is used, the usability and reuse rate of a machine application may be improved.

Depending on the purpose, various types of multiple tasks, such as instance segmentation, panoptic segmentation, keypoint detection, dense pose detection, object detection, object tracking, and the like may be performed for a decoded image.

Figure 4:
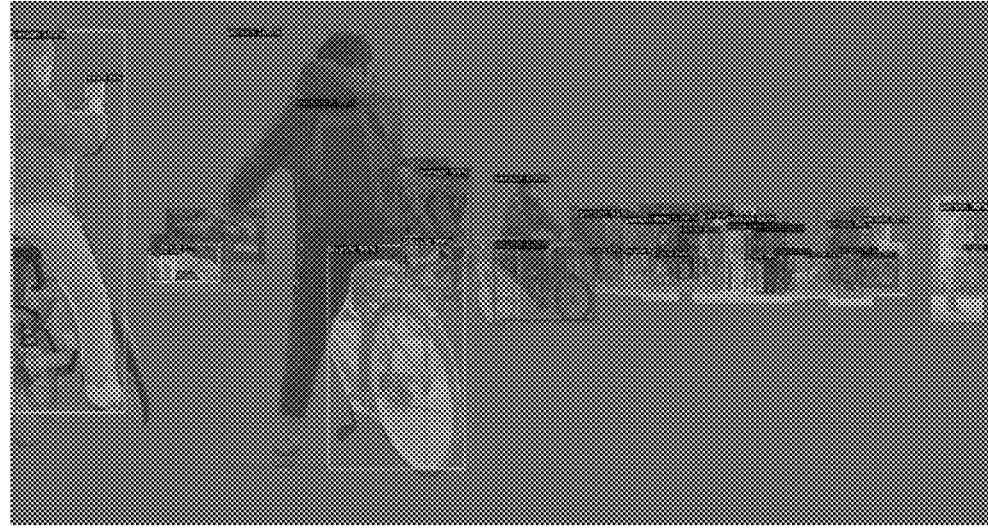
FIG. 4 is an example of a result of instance segmentation.

FIG. 4 is an example of a result of instance segmentation.

In the method according to an embodiment of the present disclosure, one or more object regions of interest may be extracted from an input image/video. Here, the multiple object regions of interest included in the single image/video may have different sizes and shapes.

Here, the object region of interest may be set by a user, or may be specified based on at least one of information about the attributes of the object region of interest, or the types of multiple tasks, or a combination thereof.

Here, the attributes of the object region of interest may include at least one of a size (e.g., a width, a height, the product of the width and the height, a ratio between the width and the height, and the like), pixel values included in the object region of interest (e.g., a minimum value, a maximum value, the different between the maximum value and the minimum value, variance in the pixel values, and the like), the type of an object included in the object region of interest, adjacency to a nearby object region of interest (e.g., whether a neighboring object region of interest adjacent to the current object region of interest is present, the distance to the neighboring object region of interest, and the like), the number/positions of object regions of interest included in a single input image/video, an object detection rate, an object-related descriptor, or a class for object classification, or a combination thereof.

Also, in the method according to an embodiment of the present disclosure, an image of the object of interest may be adjusted and transmitted in order to improve the multi-task performance at a postprocessing phase or a receiving end.

Here, the adjustment may indicate upscaling or downscaling. Depending on the above-described attributes of the object of interest, any one of upscaling and downscaling may be selectively used.

In an embodiment, any of various methods such as a super-resolution network for transforming a low-resolution image to a high-resolution image, a Gaussian pyramid, a Laplacian pyramid, and the like may be used as a method for upscaling the object region of interest (Object-Of-Interest (OOI) upscaling).

Here, upscaling the object region of interest may be performed at at least one of the preprocessing phase, the postprocessing phase, or the receiving end, or a combination thereof in order to improve a compression ratio (bpp) at the time of transmission.

Also, in the method according to an embodiment of the present disclosure, a bounding box region may replace a segment region depending on the size of the object region of interest.

Figure 5:
FIGS. 5 and 6 are examples of images to which a preprocessing network for detecting an object of interest is applied.
Figure 6:
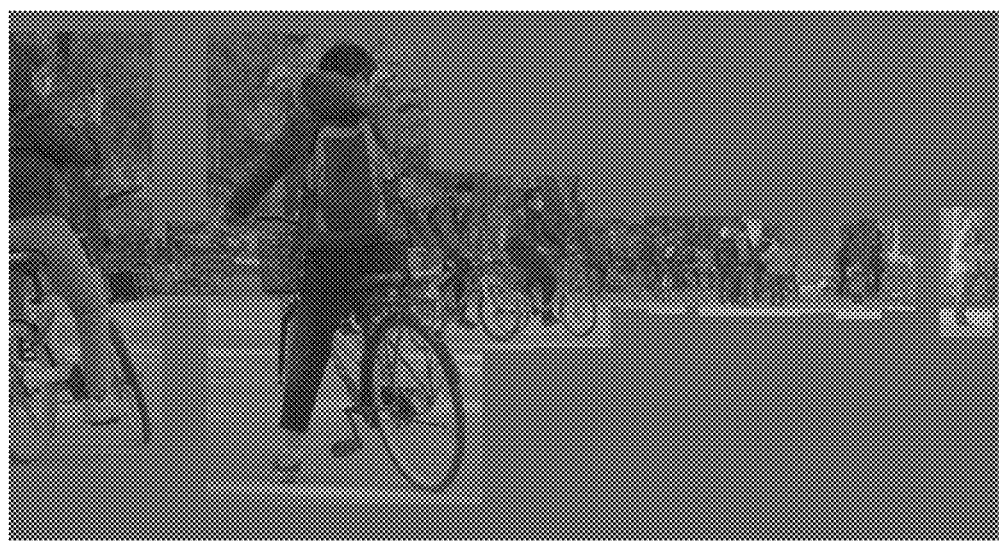

FIGS. 5 and 6 are examples of images to which a preprocessing network for detecting an object of interest is applied.

According to an embodiment, a segment region having a size equal to or less than a first threshold value, among object regions of interest, may be replaced with a bounding box region.

For example, the first threshold value may be an arbitrary value corresponding to the number of pixels greater than 0 and less than the resolution of an input image. FIG. 5 is an embodiment in which the first threshold value is set to 20000, and FIG. 6 is an embodiment in which the first threshold value is set to the resolution of the input image.

Also, in the method according to an embodiment of the present disclosure, the peripheral region of the segment region or bounding box may be added as a margin depending on the size of the object region of interest.

For an object region of interest, the size of which is equal to or less than a second threshold value, among objects regions of interest, the peripheral region of the segment or bounding box may be added as a margin.

Conversely, the segment region may be replaced with a bounding box for an object region of interest, the size of which is greater than the first threshold value, among the objects regions of interest. Also, for an object region of interest, the size of which is greater than the second threshold value, among the object regions of interest, the peripheral region of the segment or bounding box may be added as a margin.

Here, the first and second threshold values may be values predefined in at least one of the preprocessing network, the receiving end, or the machine vision network for performing multiple tasks, or a combination thereof. The first threshold value may be set equal to the second threshold value, or may be set different from the second threshold value.

The margin in the peripheral region of an individual segment having an arbitrary shape may be included by upscaling the mask of the segment and applying the same.

Here, any of various methods such as a super-resolution network for transforming a low-resolution image to a high-resolution image, a Gaussian pyramid, a Laplacian pyramid, and the like may be used as a method for mask upscaling.

Figure 7:
FIG. 7 is an example of enlarging a mask to twice the size thereof for an object of interest, the size of which is equal to or less than a preset size.

FIG. 7 is an example of enlarging a mask to twice the size thereof for an object of interest, the size of which is equal to or less than a preset size.

The margin in the peripheral region of a bounding box having a rectangular shape may be included by enlarging the bounding box by a specific number of pixels in at least one of the upward direction, the downward direction, the leftward direction, or the rightward direction, or a combination thereof. FIG. 5 and FIG. 6 are embodiments in which the size of the bounding box is increased by 20 pixels.

Additionally, a determination as to whether to add a margin or adjustment of the size of the margin may be performed depending on variance in edges, each of which is a set of consecutive pixels around which brightness values rapidly change. For example, when the variance in the edges is large, the ratio for upscaling the segment mask or the number of pixels for enlarging the bounding box may be set large, but when the variance in the edges is small, the ratio or the number of pixels may be set small.

Also, in the method according to an embodiment of the present disclosure, an object region of interest, the size of which is equal to or less than a third threshold value, among the object regions of interest, is combined with adjacent segments or bounding boxes, thereby being replaced with a single large region.

Here, the adjacent segments or bounding boxes to be combined may be limited to object regions corresponding to the same class as the class corresponding to the object region of interest.

Here, the third threshold value may also be a value predefined in at least one of the preprocessing network, the receiving end, or the machine vision network for performing multiple tasks, or a combination thereof. The third threshold value may be set equal to the first threshold value or the second threshold value. Alternatively, the third threshold value for determining whether to combine the object region of interest with adjacent segments or bounding boxes may be defined separately.

Also, in the method according to an embodiment of the present disclosure, the background region, excluding the object region of interest, may be overlaid with an image having a dominant color, an average color, a color set by a user, a degraded background image, or arbitrary texture, and may then be transmitted.

The above-described processes may be performed at the postprocessing phase or the receiving end in order to improve the compression ratio (bpp) at the time of transmission.

Here, as a method for degrading the background image, a method in which, after the image is upscaled using any of various methods, such as a super-resolution network for transforming a low-resolution image to a high-resolution image, a Gaussian pyramid, a Laplacian pyramid, and the like, the image is downscaled to the original size using any of various methods, such as the Gaussian pyramid, the Laplacian pyramid, and the like, may be used. FIGS. 5 to 7 are examples in which the dominant color is used in the background region.

Also, in the method according to an embodiment of the present disclosure, an object region of interest may be detected in only part of the input image, rather than the entire input image. That is, a single input image may be segmented into multiple regions through image segmentation, and the part of the input image may be at least one of the multiple regions included in the single input image.

Here, the part of the input image may be specified based not only on the image segmentation information but also on additional information. Here, the additional information may include at least one of viewpoint information, an object descriptor, or a probability map indicating whether an object is present, or a combination thereof.

Accordingly, only the segment or bounding box of the object of interest (e.g., a human) detected in the part of the input image is transmitted, whereby a compression ratio (bpp) may be increased.

Figures 8, 9:
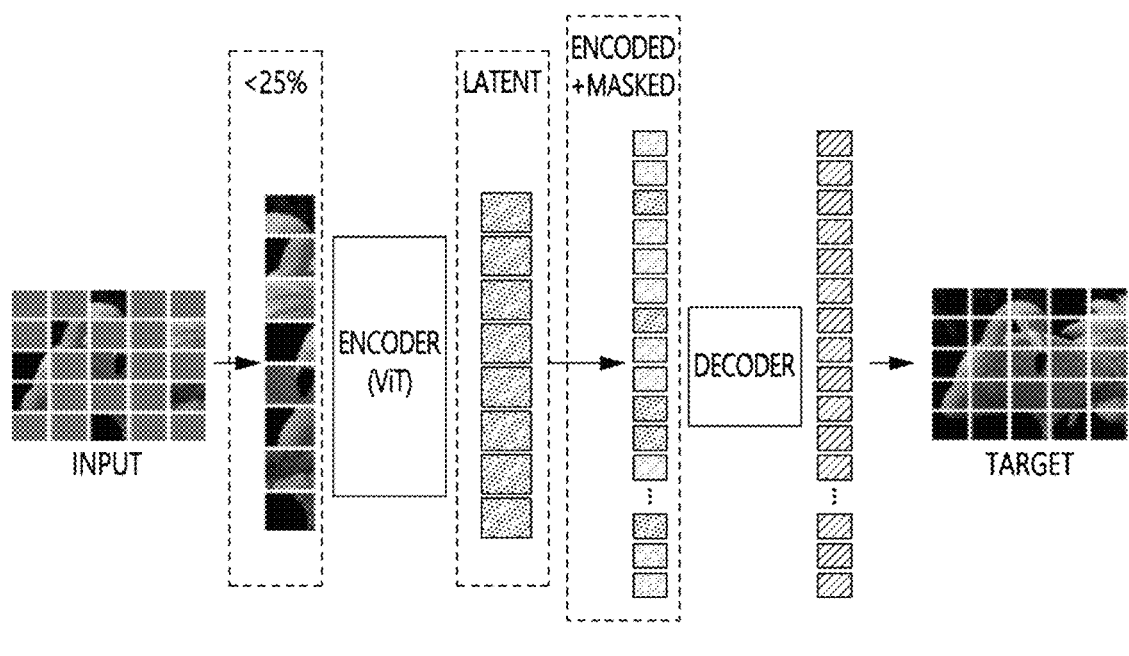
FIG. 8 illustrates a structure diagram of a Masked Auto-encoders (MAE) network.
FIG. 9 is an example of the types of masks of an MAE network.

FIG. 8 illustrates the structure diagram of a Masked Autoencoders (MAE) network.

FIG. 9 is an example of the types of masks of an MAE network.

In the method according to an embodiment of the present disclosure, an image is transmitted after part of the image is masked at the preprocessing phase or the transmitting end, and the original image is reconstructed at the postprocessing phase or the receiving end, after which a task is performed.

Accordingly, the task performance and the compression ratio (bpp) may be improved.

Here, in order to reconstruct the original image, a Masked Autoencoders (MAE) network, or the like may be used. The MAE network may correspond to a network configured to receive an image including masked patches and reconstruct an original image.

An input image having high resolution may be divided into image segments, each having specific resolution, and the above-described steps may be performed for each of the image segments. Here, the specific resolution may be the maximum resolution capable of being processed by the MAE network.

Also, after the image segments including masked regions are received, the original image segments are reconstructed and combined with each other at the postprocessing phase or the receiving end, whereby the input image having high resolution may be reconstructed. The input image having high resolution may be downscaled to have specific resolution using any of various methods such as a Gaussian pyramid, a Laplacian pyramid, and the like, and the above-described steps may be performed on the entirety of the downscaled image. Here, the specific resolution may be the maximum resolution capable of being processed by the MAE network.

Also, the downscaled image, the part of which is masked, is received and the downscaled image is reconstructed at the postprocessing phase or the receiving end, after which the input image having high resolution may be reconstructed using any of various methods such as a super-resolution network for transforming a low-resolution image to a high-resolution image, a Gaussian pyramid, a Laplacian pyramid, and the like. Here, in order to improve the image quality of the reconstructed input image, a Laplacian image acquired by subtracting the reconstructed input image from the original input image may be added.

The masked patch may be generated using a method such as a random masking or block-wise masking in the region from which the object region of interest in the form of a segment or bounding box is excluded.

FIG. 10 illustrates instance segmentation performance and a compression ratio of when a preprocessing network for detecting an object of interest is applied.

Figure 11:
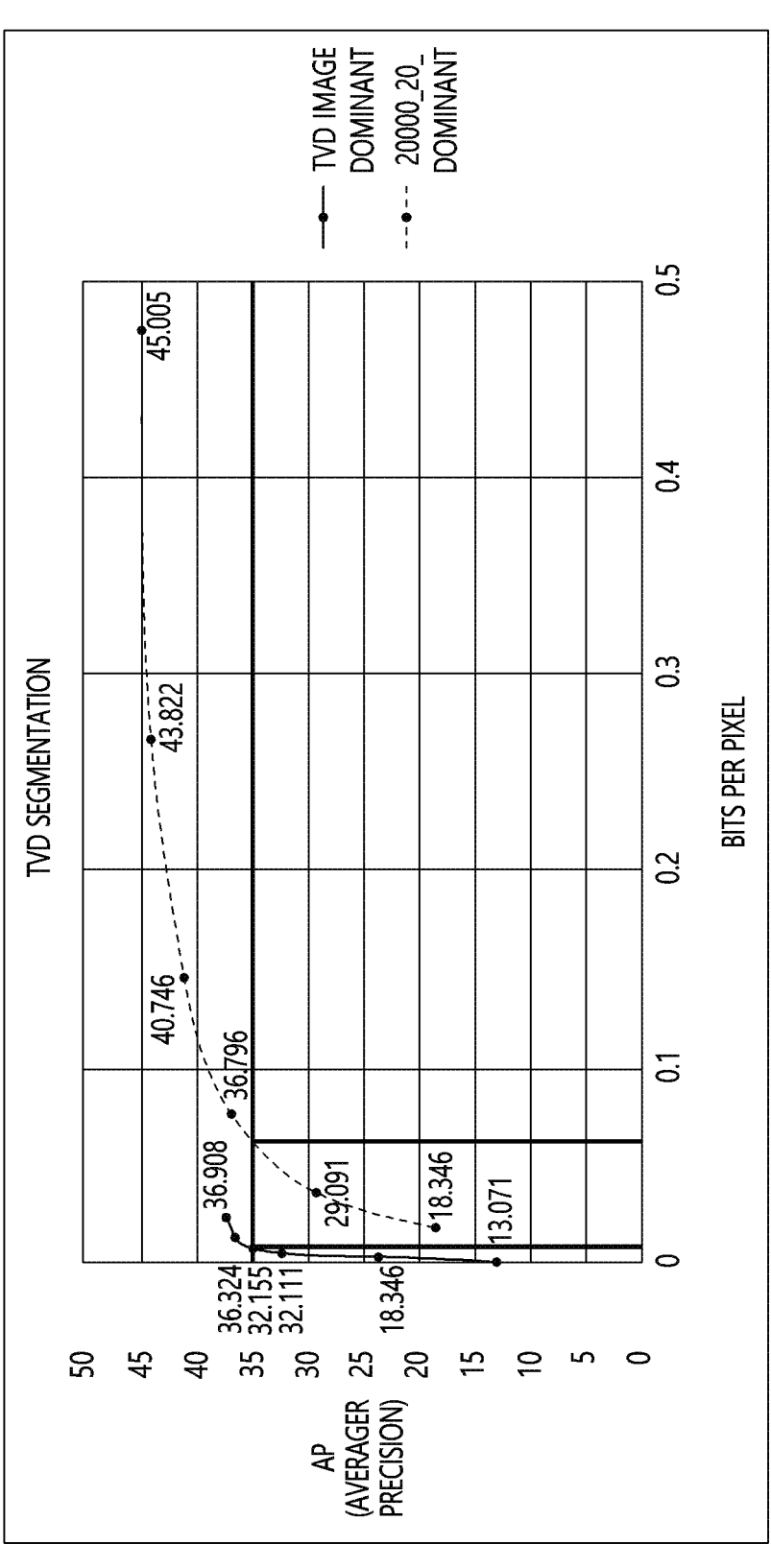
FIG. 11 is a graph of bits per pixel (BPP) and mean Average Precision (mAP) of instance segmentation when preprocessing corresponding to FIG. 5 is performed.

FIG. 11 is a graph of bits per pixel (BPP) and mean Average Precision (mAP) of instance segmentation when preprocessing corresponding to FIG. 5 is performed.

Figure 12:
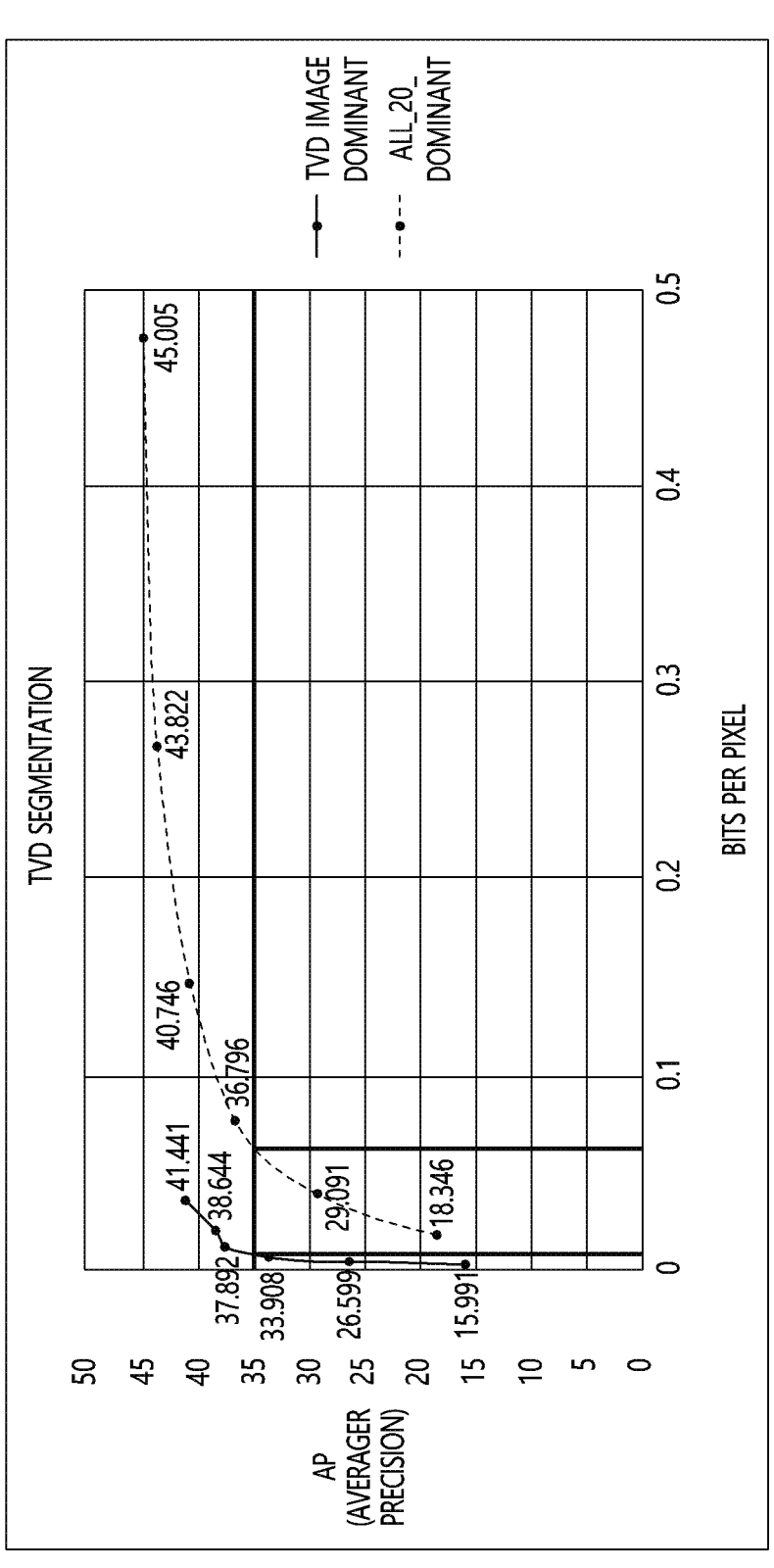
FIG. 12 is graph of BPP and mAP of instance segmentation when preprocessing corresponding to FIG. 6 is performed.

FIG. 12 is graph of BPP and mAP of instance segmentation when preprocessing corresponding to FIG. 6 is performed.

As illustrated in FIG. 11 and FIG. 12, it can be seen that, when the preprocessing network for detecting an object of interest according to the present disclosure is used, the compression ratio is significantly improved at the same precision (mAP), compared to when the entire image is transmitted.

Figure 13:
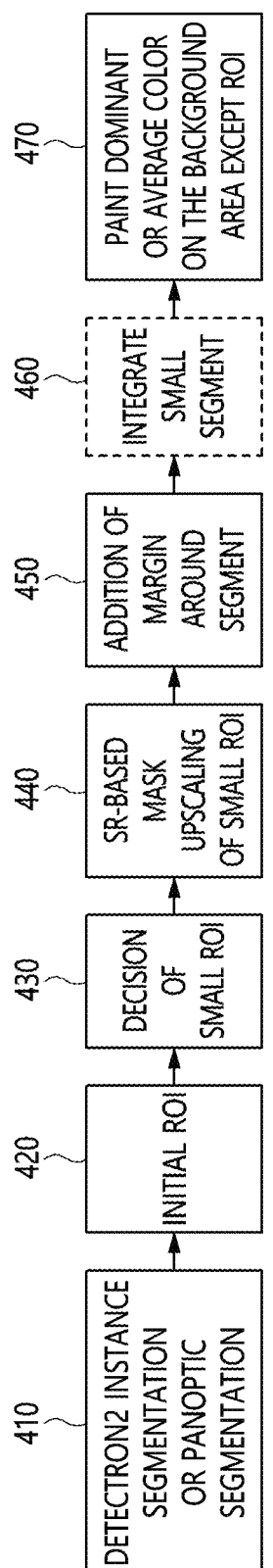
FIG. 13 illustrates another embodiment of a preprocessing network for detecting an object of interest.

FIG. 13 illustrates another embodiment of a preprocessing network for detecting an object of interest.

Referring to FIG. 13, the preprocessing network for detecting an object of interest according to an embodiment of the present disclosure may include a network structure or module in order to perform segmenting an instance at step 410, extracting an initial object region of interest at step 420, determining an object region of interest, the size of which is less than a specific size, at step 430, upscaling the object region of interest, the size of which is less than the specific size, based on super-resolution at step 440, adding a margin region to a bounding box or a segment region at step 450, integrating small object regions of interest at step 460, and preprocessing a background region at step 470.

Figure 14:
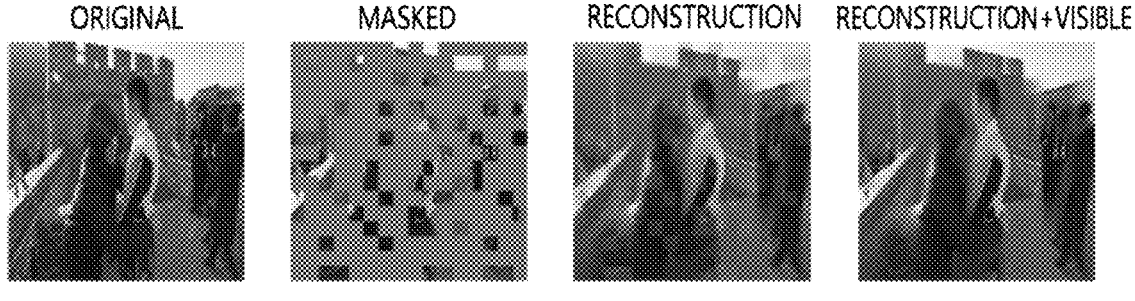
FIG. 14 is an example of an image to which the object detection preprocessing network illustrated in FIG. 13 is applied.

FIG. 14 is an example of an image to which the preprocessing network for object detection illustrated in FIG. 13 is applied.

Figure 15:
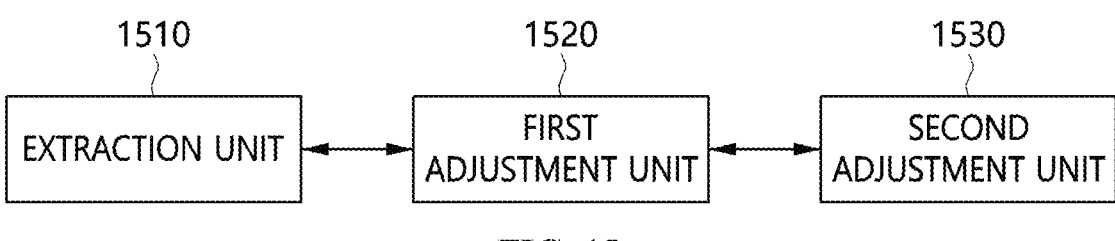
FIG. 15 is a block diagram illustrating an apparatus for image preprocessing based on an object of interest according to an embodiment of the present disclosure.

FIG. 15 is a block diagram illustrating an apparatus for image preprocessing based on an object of interest according to an embodiment of the present disclosure.

The apparatus for image preprocessing based on an object of interest according to an embodiment of the present disclosure includes an extraction unit 1510 for extracting an object region of interest from an input image, a first adjustment unit 1520 for adjusting the object region of interest, and a second adjustment unit 1530 for adjusting a background region excluding the object region of interest.

Here, the object region of interest may be in the form of a segment or a bounding box.

Here, the object region of interest may be extracted in the form of a segment when the height or width of the object region of interest is greater than a first threshold, but may be extracted in the form of a bounding box when the height or width of the object region of interest is equal to or less than the first threshold.

Here, the extraction unit 150 may add a margin region in the peripheral region of the object region of interest when the size of the object region of interest is equal to or less than a second threshold.

Here, when the object region of interest corresponds to a segment region, the margin region may be added based on an upscaled segment region acquired by upscaling the segment region.

Here, for multiple object regions of interest, the extraction unit 1510 may combine the object region of interest with another object region of interest within a preset distance therefrom when the height or width of the object region of interest is equal to or less than a third threshold.

Here, the second adjustment unit 1530 may adjust the background region using any one of an image in the dominant color of the background region, an image in the average color thereof, an image in the color set by a user, and a degraded background region image.

Here the input image may correspond to a segmented image generated by performing masking on an original image.

Here, the extraction unit 1510 may store attribute information of the object region of interest, and the attribute information of the object region of interest may include the height of the object region of interest, the width thereof, the pixel values thereof, an object type, and information about the distance to a nearby object region of interest.

Here, the extraction unit 1510 may extract the object region of interest from part of the input image.

According to the present disclosure, the compression ratio of an image and video for machine consumption may be improved.

Also, the present disclosure may improve multi-task performance through image and video coding for machine consumption.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for image preprocessing based on an object of interest, comprising:

extracting an object region of interest from an input image;

adjusting the object region of interest; and adjusting a background region excluding the object region of interest, wherein the object region of interest is in a form of a segment or a bounding box, wherein the object region of interest is extracted in a form of a segment when a height or width of the object region of interest is greater than a first threshold, but is extracted in a form of a bounding box when the height or width of the object region of interest is equal to or less than the first threshold.

2. The method of claim 1, wherein extracting the object region of interest comprises adding a margin region in a peripheral region of the object region of interest when a size of the object region of interest is equal to or less than a second threshold.

3. The method of claim 2, wherein, when the object region of interest corresponds to a segment region, the margin region is added based on an upscaled segment region acquired by upscaling the segment region.

4. The method of claim 1, wherein adjusting the background region comprises adjusting the background region using any one of an image in a dominant color of the background region, an image in an average color thereof, an image in a color set by a user, and a degraded background region image.

5. The method of claim 1, wherein the input image corresponds to a segmented image generated by performing masking on an original image.

6. The method of claim 1, wherein:

extracting the object region of interest comprises storing attribute information of the object region of interest, and the attribute information of the object region of interest includes a height of the object region of interest, a width thereof, pixel values thereof, an object type, and information about a distance to a nearby object region of interest.

7. The method of claim 1, wherein extracting the object region of interest comprises extracting the object region of interest from part of the input image.

8. A method for image preprocessing based on an object of interest, comprising:

extracting an object region of interest from an input image;

adjusting the object region of interest; and adjusting a background region excluding the object region of interest, wherein extracting the object region of interest comprises, when multiple object regions of interest are present, combining the object region of interest with an additional object region of interest within a preset distance therefrom when a height or width of the object region of interest is equal to or less than a third threshold.

9. An apparatus for image preprocessing based on an object of interest, comprising:

a processor; and a memory operably coupled to the processor and storing instructions that, when executed by the processor, cause the apparatus to:

extract an object region of interest from an input image;

adjust the object region of interest; and adjust a background region excluding the object region of interest, wherein the object region of interest is in a form of a segment or a bounding box, wherein the object region of interest is extracted in a form of a segment when a height or width of the object region of interest is greater than a first threshold, but is extracted in a form of a bounding box when the height or width of the object region of interest is equal to or less than the first threshold.

10. The apparatus of claim 9, wherein the instructions further cause the apparatus to add a margin region in a peripheral region of the object region of interest when a size of the object region of interest is equal to or less than a second threshold.

11. The apparatus of claim 10, wherein, when the object region of interest corresponds to a segment region, the margin region is added based on an upscaled segment region acquired by upscaling the segment region.

12. The apparatus of claim 9, wherein, the instructions, when multiple object regions of interest are present, further cause the apparatus to combine the object region of interest with an additional object region of interest within a preset distance therefrom when a height or width of the object region of interest is equal to or less than a third threshold.

13. The apparatus of claim 9, wherein the instructions further cause the apparatus to adjust the background region using any one of an image in a dominant color of the background region, an image in an average color thereof, an image in a color set by a user, and a degraded background region image.

14. The apparatus of claim 9, wherein the input image corresponds to a segmented image generated by performing masking on an original image.

15. The apparatus of claim 9, wherein:

the instructions further cause the apparatus to store attribute information of the object region of interest, and the attribute information of the object region of interest includes a height of the object region of interest, a width thereof, pixel values thereof, an object type, and information about a distance to a nearby object region of interest.

16. The apparatus of claim 9, wherein the instructions further cause the apparatus to extract the object region of interest from part of the input image.

* * * * *